(12) United States Patent
Harder et al.

(10) Patent No.: US 9,682,260 B2
(45) Date of Patent: Jun. 20, 2017

(54) FIRE EQUIPMENT

(71) Applicant: EcoPeople B.V., Berkel en Rodenrijs (NL)

(72) Inventors: Abraham Harder, Berkel en Rodenrijs (NL); Flip Ziedses Des Plantes, Amsterdam (NL)

(73) Assignee: ECOPEOPLE B.V., Berkel en Rodenrijs (NL)

( * ) Notice: Subject to any disclaimer, the term of this patent is extended or adjusted under 35 U.S.C. 154(b) by 172 days.

(21) Appl. No.: 14/408,971

(22) PCT Filed: Jun. 13, 2013

(86) PCT No.: PCT/EP2013/001784
§ 371 (c)(1),
(2) Date: Dec. 18, 2014

(87) PCT Pub. No.: WO2013/189585
PCT Pub. Date: Dec. 27, 2013

(65) Prior Publication Data
US 2015/0134544 A1    May 14, 2015

(30) Foreign Application Priority Data
Jun. 18, 2012    (NL) ...................................... 1039682

(51) Int. Cl.
*A62C 13/78*    (2006.01)
*A62C 8/06*    (2006.01)
*G06Q 30/00*    (2012.01)

(52) U.S. Cl.
CPC ................ *A62C 13/78* (2013.01); *A62C 8/06* (2013.01); *G06Q 30/012* (2013.01)

(58) Field of Classification Search
CPC ............ A62C 8/06; A62C 13/76; A62C 31/28
See application file for complete search history.

(56) References Cited

U.S. PATENT DOCUMENTS

| 2,143,635 | A | * | 1/1939 | Schaaf | A62C 99/0027 169/11 |
| 2003/0000864 | A1 | * | 1/2003 | Carraro | A62C 13/78 206/576 |
| 2004/0262018 | A1 | * | 12/2004 | Roussin | A62C 8/06 169/50 |
| 2007/0158084 | A1 | * | 7/2007 | Schwartz | A62C 8/06 169/30 |

FOREIGN PATENT DOCUMENTS

| DE | 3232261 A1 | 3/1984 |
| JP | 2006150026 A | 6/2006 |
| WO | 0241949 A1 | 5/2002 |

* cited by examiner

*Primary Examiner* — Sarah McPartlin
(74) *Attorney, Agent, or Firm* — Kenealy Vaidya LLP

(57) ABSTRACT

The present invention relates to equipment for fire fighting and fire prevention. The invented fire equipment comprises a fire blanket, a fire extinguisher and a housing assembly for housing the fire blanket and the fire extinguisher. The housing assembly enables the fire blanket and the fire extinguisher to be easily and quickly accessible and removable.

20 Claims, 7 Drawing Sheets

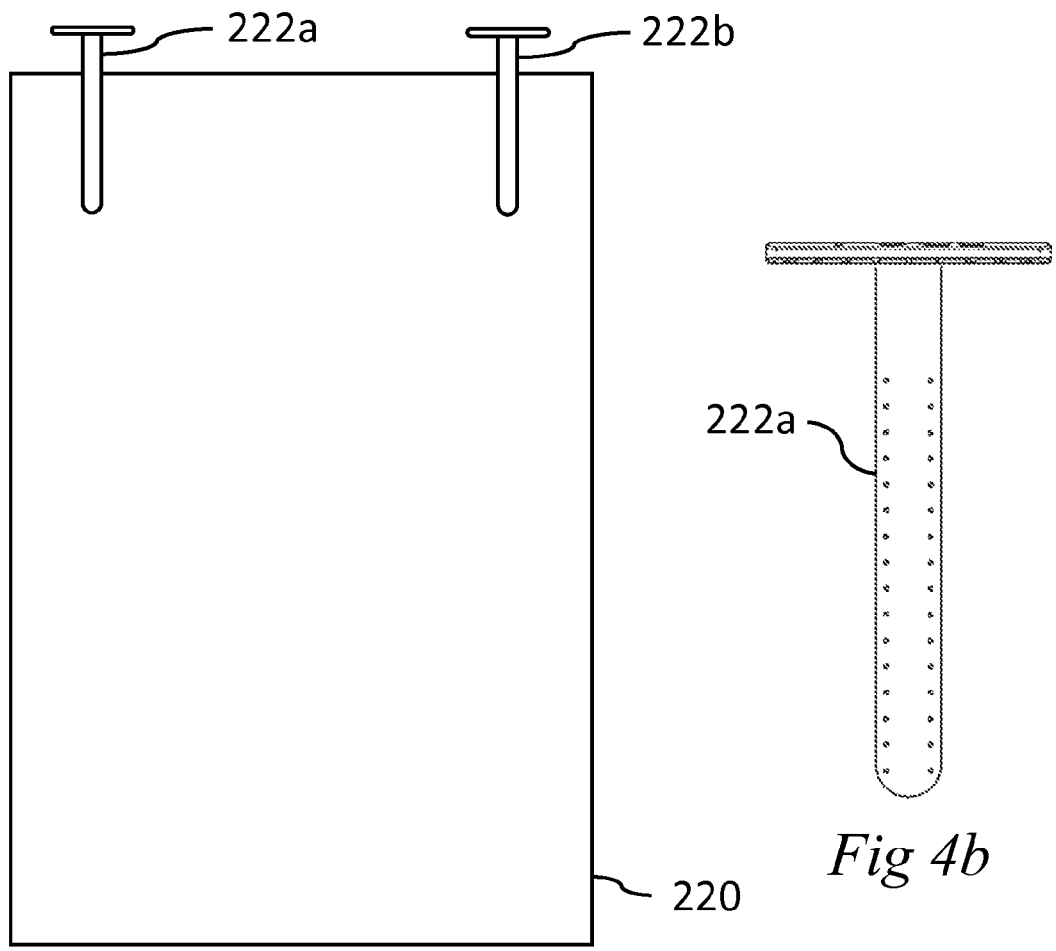
*Fig 4a*
*Fig 4b*
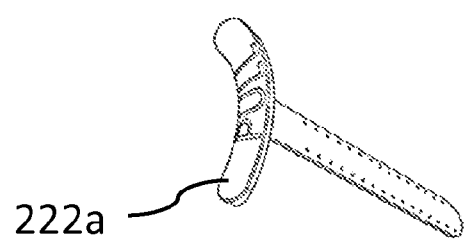
*Fig 4c*

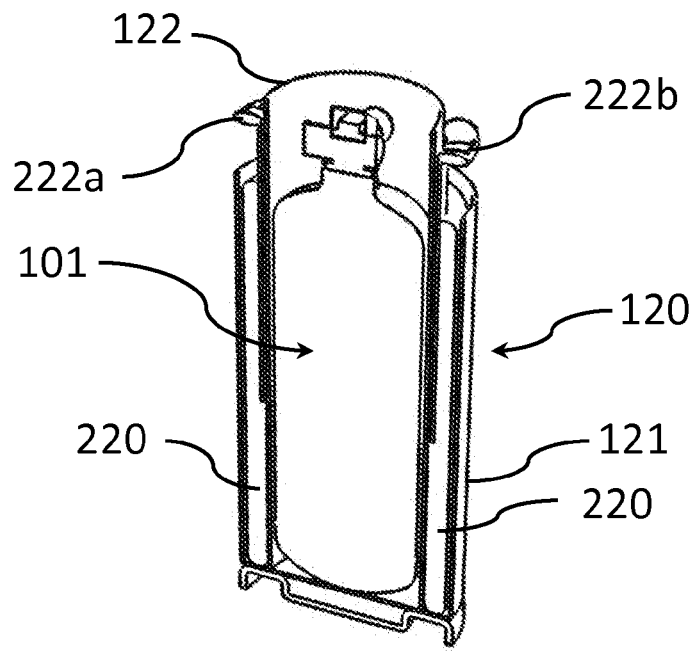
*Fig 6a*
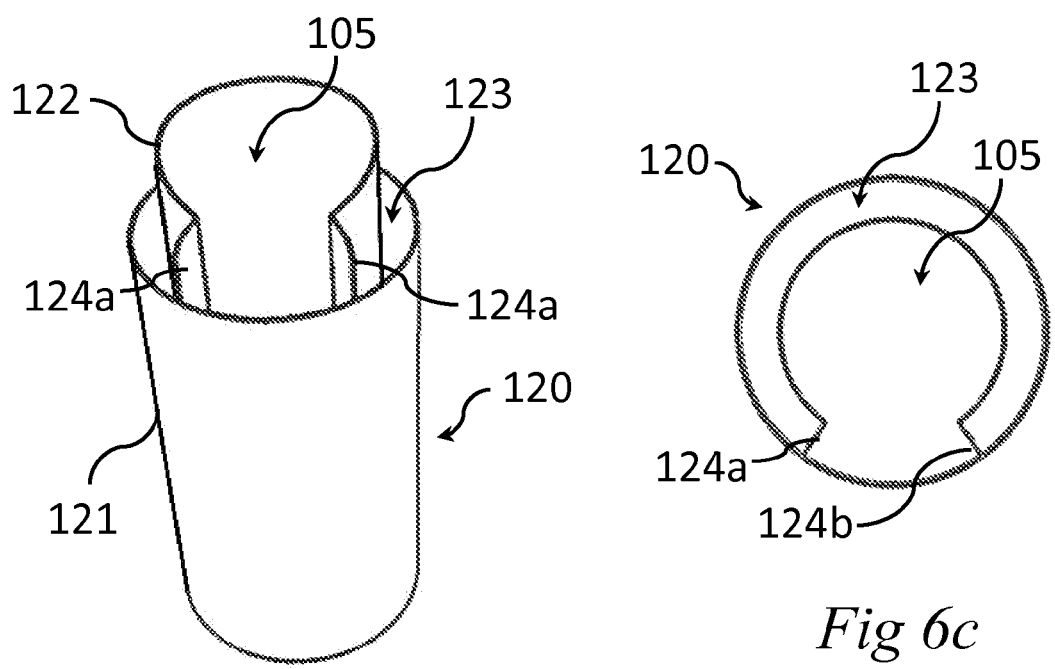
*Fig 6b*
*Fig 6c*

FIRE EQUIPMENT

TECHNICAL FIELD

The present invention relates to equipment for firefighting and fire prevention. The fire equipment comprises a fire blanket, a fire extinguisher and a housing assembly for housing the fire blanket and the fire extinguisher

BACKGROUND

It is known, at the present time, to provide a fire extinguisher adapted to emit water, carbon dioxide or fire extinguishing foam, or adapted to emit a fire extinguishing powder with a charge of compressed gas contained within a canister. Such fire extinguishers, hereinafter referred to as fire extinguisher, may be of particular benefit in connection with fires of a specific type. However, fire extinguishers of this type are not ideal for use in a situation where a flammable liquid is on fire, for example where a frying pan is ablaze. In cases of such emergency a fire blanket as known in the current state of the art is an effective means to put out such fires which typically occur in household kitchens. Depending on the types of fire a fire extinguisher or a fire blanket is required to put out the fire. It can be convenient, logical, and therefore safer to have both fire extinguisher and fire blanket located at the same place in order to choose at the location for the best option, be it using a fire extinguisher or fire blanket. A further step of collocation of fire extinguisher and fire blanket is realized in the current state of the art as disclosed in for example patent application GB2212721A, wherein fire equipment is disclosed comprising a housing which contains a fire blanket which can be removed from the housing, and which supports a fire extinguisher of the type which expels fire extinguishing material by means of compressed gas.

In the current solution the housing is designed to be fixed-mounted to a vertical surface, and therefore means are provided to either support the fire extinguisher, by the housing and/or to releasably mount the fire extinguisher on the housing. A disclosed means for engaging the fire extinguisher to the housing is a resilient clip.

The problem with the current solution is that the means for fixed-mounting makes it difficult or at least inconvenient to move the fire extinguisher together with the fire blanket from one place to another. The current state of the art configuration of the housing, providing access to the fire blanket, either from the bottom or from the sides of the housing, limits the possibilities to mount the housing with respect to easy access of the fire blanket. Placing in a corner limits for example access from the side, whereas placing near the floor limits access from the bottom. Therefore the current solution has limitations with regard to safe employment of the fire extinguisher or the fire blanket.

SUMMARY

It is an object of the invention to improve fire equipment with regard to safety, operability and convenient use of the equipment, compactness of the equipment, portability of the equipment, integration of various fire preventing and firefighting related devices, and accessibility of these elements. Furthermore it is an object of the invention to improve the use and application of the fire equipment with regard to integration in a room environment, outdoor environment, safe placement, quick and easy accessibility of devices contained in the fire equipment, and safe manipulation of said devices once removed. By providing these improvements through the present invention, ultimately safety of the living or working environment of people and animals is increased;

Hereinafter "Fire Equipment" refers to the fire equipment according to the invention unless specifically stated that it refers to current state of the art fire equipment.

In order to realize the objects of the invention, Fire Equipment is provided comprising a housing assembly for housing a fire blanket and a fire extinguisher. The housing assembly comprises a first housing for substantially covering the fire extinguisher and the fire blanket. The fire extinguisher may be wrapped in the fire blanket. For this purpose, the fire blanket may be rolled-up around the fire extinguisher. The fire blanket may also be folded around the fire extinguisher, or first folded and then rolled-up around the fire extinguisher. In this way the removable fire blanket positioned in the first housing leaves a first hollow for removably housing the fire extinguisher. The fire extinguisher may be removably housed in a second housing which separates the fire extinguisher from the fire blanket. This facilitates easy removal of the fire extinguisher in case the fire blanket has to stay in place. The second housing for the fire blanket may also be arranged to enclose the fire blanket as well. In this case the second housing has an outer wall and an inner wall. Between the outer wall and the inner wall a second hollow is provided for removably housing the fire blanket. The second housing is formed in such a way to form fit a fire extinguisher, thus arranged for removably housing the fire extinguisher. The housing assembly may be equipped with opening and closing means. The fire blanket and/or the fire extinguisher can be removed if housing assembly is in an open position. The fire extinguisher and the fire blanket can be removed independently of each other. The fire extinguisher comprises means containing a charge of fire extinguishing material adapted to be expelled from the extinguisher. The fire extinguisher comprises a trigger mechanism for activation and control of the emission of the fire extinguishing material (hereinafter the trigger mechanism is called "valve"). Preferably, the tips of any part of the valve do not protrude beyond the circumference of the inside of the first housing.

Alternatively a support is provided for attachment to a wall for supporting the Fire Equipment. The Fire Equipment may be clamped in the handle in situations where wall mounting is preferred. The arrangement for wall mounting is such that accessibility remains optimal as long as the top of the first housing is easily accessible. Usually this requires the Fire Equipment to be mounted at an optimal height between 100 cm to 140 cm. Access from the top in the case of wall mounting is for example advantageous in cases where little children should be restricted in access to the Fire Equipment.

Free placement on the floor as well as removably mounting the Fire Equipment on a wall, enables the user, in case of emergency to decide to remove the fire extinguisher and/or the fire blanket at the location of the current position of the Fire Equipment. In case of placement on the floor of the Fire Equipment, the user may decide to lift the Fire Equipment from the floor and carry the Fire Equipment to the location of the fire and then remove the fire extinguisher and/or the fire blanket. In case of wall mounting of the Fire Equipment, the user may decide to remove the housing assembly together with the contents from the handle mounted on a wall, and to carry the housing assembly together with the contents to the location of the fire and then remove the fire extinguisher and/or the fire blanket. Thus maximum flexibility, mobility and efficiency are obtained, resulting in improvement of safety.

The following points out the advantageous situations where safety is increased by employment of the Fire Equipment.

The improved mobility of the Fire Equipment provides a lower threshold for taking the Fire Equipment to places where undesired fire may occur.

Especially with noticeably increase of fires because of (bio) ethanol fireplaces and—burners, in general, fire equipment should be positioned near these open fireplaces. The movable Fire Equipment provides easy changing of places of the Fire Equipment, in order to have the Fire Equipment as close as possible to especially open fires. Especially useful is the Fire Equipment for outdoor use. Outdoor kitchens and barbecues are often causes of uncontrolled outbreaks of fire. The Fire Equipment is easy to carry from inside a house to an outside garden, or to transport to outdoor areas such as camping sites. Furthermore by providing a housing in which a fire extinguisher, a fire blanket and optionally accessories may be stored, the design leaves much freedom in outside form, colour and choice of material.

The integration of housing, devices and optionally accessories provides for a compact, convenient, stylish and above all, safe solution.

Too often fire equipment of the current state of the art is not bought by consumers because it does not fit with the style of a living room for example. If current fire equipment is nevertheless bought, it is too often stowed away in a front room, a cellar or hidden in a closet, because the inhabitants do not like the aesthetics of current fire devices. This leads to a suboptimal placement of such current devices.

The design of the invented Fire Equipment with a strong integration of devices and components may lower the threshold for a consumer to buy the Fire Equipment and/or to place the Fire Equipment in a household in the vicinity of a possible hazardous fireplace.

Preferably the Fire Equipment is arranged to be placed on or close to a floor, and therefore means are provided for opening the first housing from the top. This enables movability without the need for a wall to mount the Fire Equipment to. In case of a fire and especially in case of a flashover, the lower area of a room is considered to be safer. Therefore a user of the Fire Equipment is safer if he would be able to grasp the Fire Equipment from the floor. The following serves as explanation of a flashover.

A flashover is the near-simultaneous ignition of most of the directly exposed combustible material in an enclosed area. When certain organic materials are heated they undergo thermal decomposition and release flammable gases. Flashover occurs when the majority of the exposed surfaces in a space are heated to their auto ignition temperature and emit flammable gases. Flashover normally occurs at 500° C. (930° F.) or 1,100° F. for ordinary combustibles, and an incident heat flux at floor level of 1.8 Btu/ft.$^{2*}$s (20 kW/m$^2$).

An example of flashover is when a piece of furniture is ignited in a domestic room. The fire involving the initial piece of furniture can produce a layer of hot smoke which spreads across the ceiling in the room. The hot buoyant smoke layer grows in depth, as it is bounded by the walls of the room. The radiated heat from this layer heats the surfaces of the directly exposed combustible materials in the room, causing them to give off flammable gases via pyrolysis. When the temperature of the evolved gases becomes high enough, these gases will ignite, throughout their extent.

In one of the embodiments of the invention the integration or the housing of a carbon monoxide detection unit is proposed. Especially with the invented Fire Equipment, positioning of a carbon monoxide detector in the Fire Equipment positioned near the floor or up to a height of maximum 150 centimeters (as advised by standardization bodies) is advantageous. Carbon monoxide has the characteristic that it does not rise towards the ceiling of a closed room, because the density of carbon monoxide is almost equal to the density of air. Placement of a carbon monoxide detector on a ceiling as often is the case in especially domestic rooms will therefore not be effective in case of a hazardous carbon monoxide emission of e.g. a malfunctioning furnace, heater, geyser or boiler.

DESCRIPTION OF DRAWINGS

In order that the invention may be more readily understood, and so that further features thereof may be appreciated, the invention will now be described, by way of example, with reference to the accompanying drawings in which:

FIG. 4a shows a view of a spread out fire blanket according to a preferred embodiment of the invention;

FIG. 4b shows a front view of a grip of a fire blanket according to a preferred embodiment of the invention.

FIG. 4c shows a perspective view of a grip of a fire blanket according to a preferred embodiment of the invention;

FIG. 6a shows a perspective of a sectional view through the Fire Equipment according to a preferred embodiment of the invention;

FIG. 6b shows a perspective of a detail of a second housing with an outer wall and an inner wall according to a preferred embodiment of the invention; and FIG. 6c shows a top view of a detail of a second housing with an outer wall and an inner wall according to a preferred embodiment of the invention.

DETAILED DESCRIPTION

Figure 1:
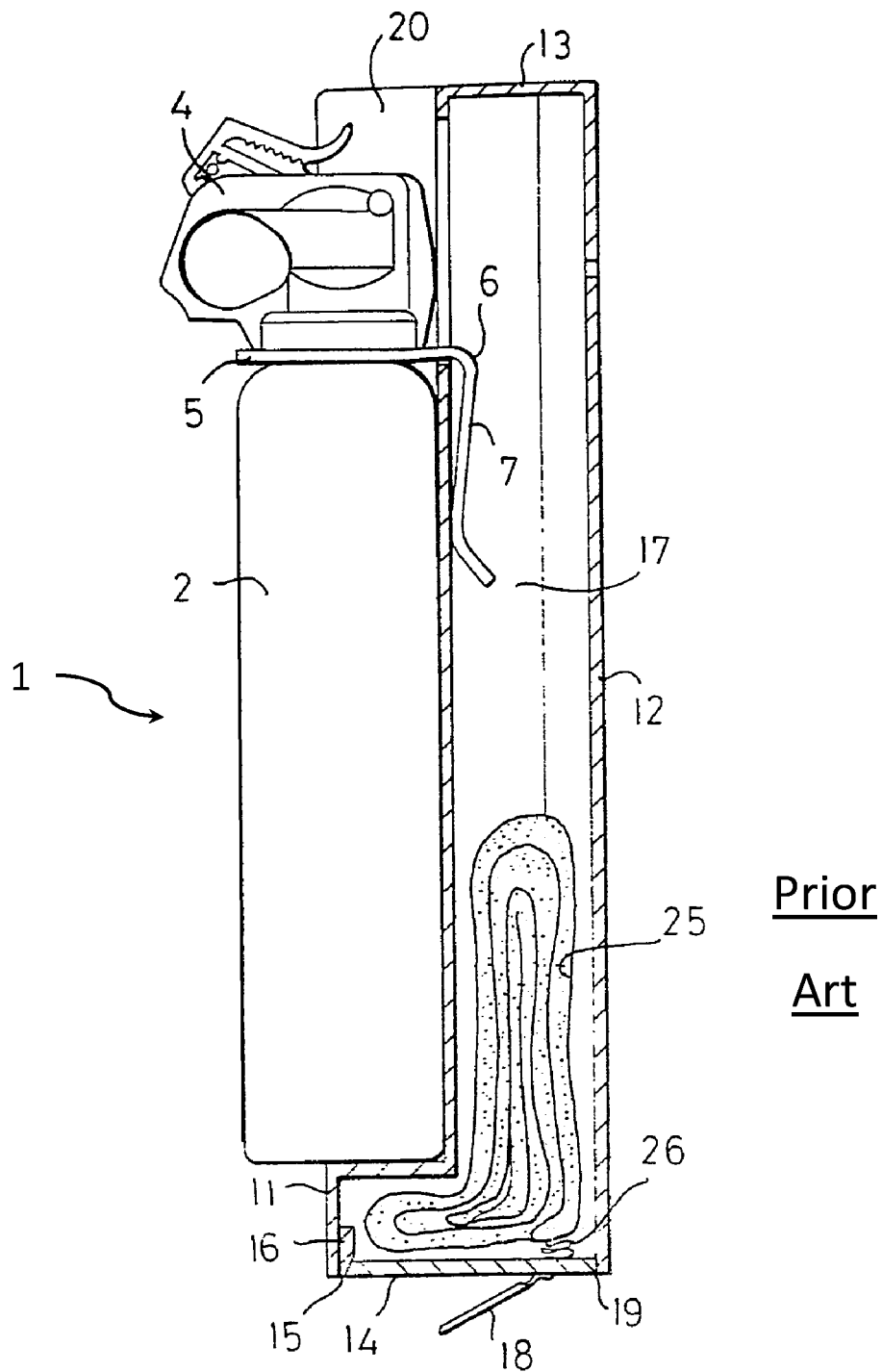
FIG. 1 is a view of a prior art solution.

Referring now to FIG. 1, a prior art solution is shown, wherein a fire extinguisher 1 with canister 2 and valve 4 is attached, with ring shaped element 5, retaining clip 6 and resilient finger 7, in a recess 20 of a housing for a fire blanket 25. The housing comprises an upstanding front wall 11, a rear wall 12, a top wall 13, and a base 14. The fire blanket 25 may be removed from the housing by pulling handle 18 situated at the edge of the base 19, and moving base 14 and tab 16 pivotably through hinge 15 downward. A loop 19 is provided to grab fire blanket 25 and remove fire blanket 25 from the interior 17.

Figure 2:
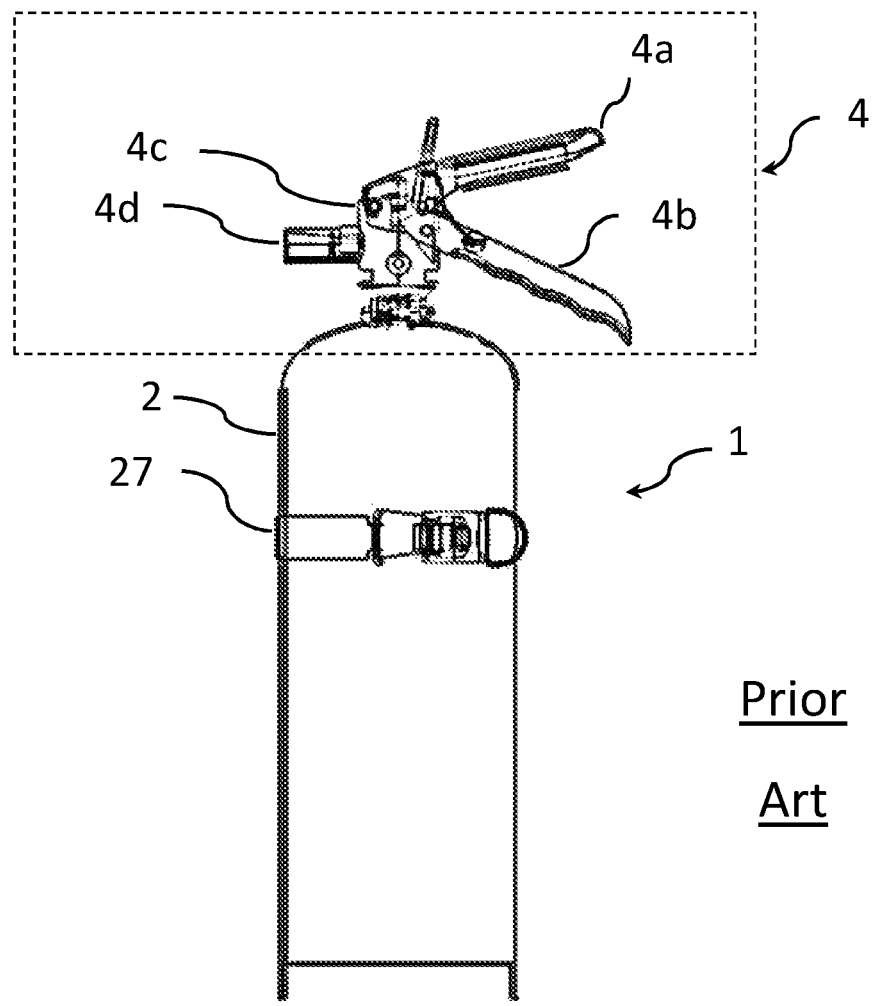
FIG. 2 is a view of a prior art fire extinguisher.

Referring to FIG. 2 a view of a prior art fire extinguisher 1 is shown with a canister 2, a valve 4, an upper grip 4a, a lower grip 4b, a hinge 4c, a nozzle 4d and a handle 27 for releasably attaching the fire extinguisher 1 to for example a wall. Current fire extinguishers are configured such that tips of the valve 4 protrude substantially beyond the circumference of the canister. This provides more momentum for operating the trigger mechanism, but is not optimal for being removably housed in a first housing according to the invention. The inner dimensions of the first housing of the invention would largely depend on the size of the protrusion of the valve 4, especially grips 4a and 4b, which would lead to an inefficient design of the first housing according to the invention. Moreover this would obstruct smooth, quick and easy removal of the fire blanket according to the invention.

Figure 3:
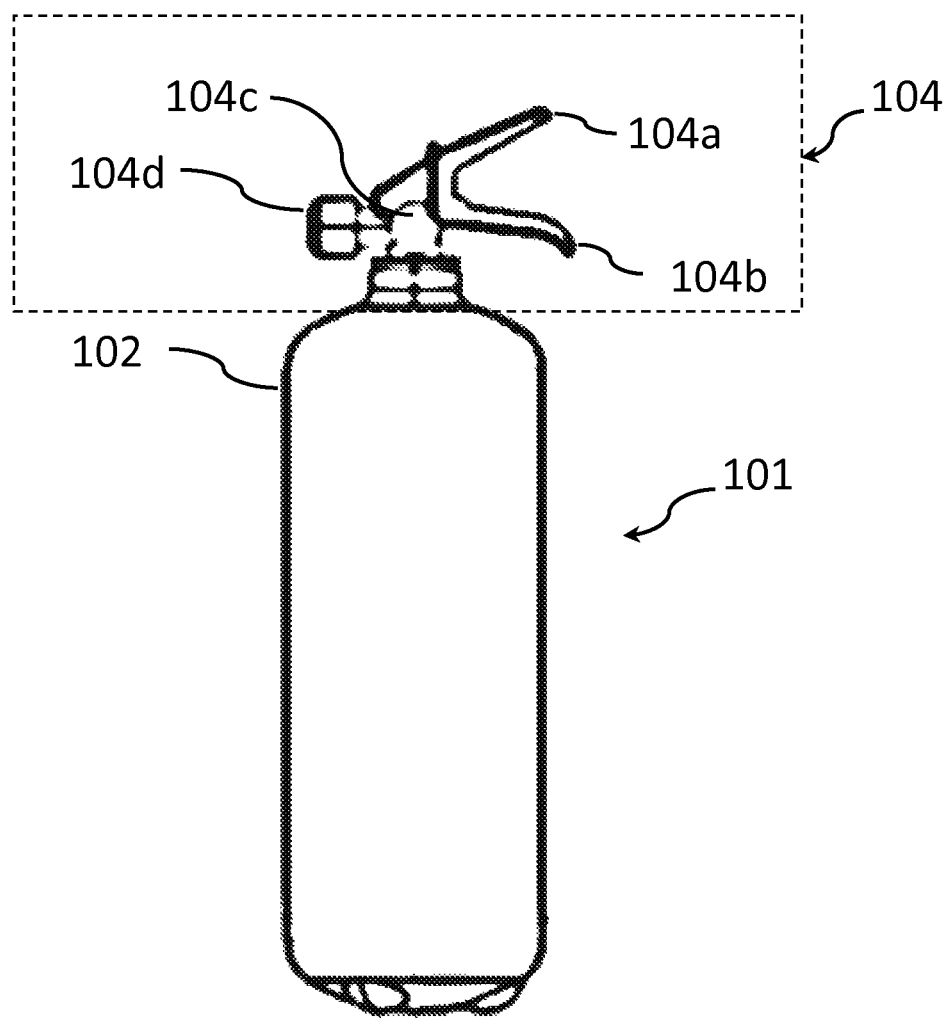
FIG. 3 is a side view of a fire extinguisher in according to a preferred embodiment of the invention.

Referring now to FIG. 3, of the accompanying drawings, a fire extinguisher 101 in accordance with the invention is shown, including a control trigger arrangement 104 (also known as valve). The valve comprises outlet nozzle 104d, upper grip 104a, lower grip 104b, wherein grips 104a,b are pivotably mounted through hinge 104c to operate nozzle 104d. The fire extinguisher comprises a substantially cylindrical hollow housing 102 (hereinafter referred to as "canister") containing a charge of fire extinguishing material adapted to be expelled from the container by means of compressed gas. The fire extinguisher 101 comprises a trigger mechanism 104 for activation and control of the emission of the fire extinguishing material. In a preferred embodiment, the tips of any part of the trigger mechanism, especially lower grip 104b and upper grip 104a, do not protrude beyond the circumference of the inner wall of the first housing. In this way the trigger mechanism will not hinder smooth removal of the fire blanket out of the second housing, which by consequence improves safe use. Even more preferably, the tips do not protrude beyond the circumference of the canister.

Referring now to FIG. 4, of the accompanying drawings, a fire blanket 220 is shown, including at least two (rigid) grips 222a,b and 222b, made out of self-extinguishing or fire-retardant material such as fire retardant polypropylene, fibre glass reinforced polyester or glass filled polycarbonate. The shape of the grips 222a,b may be fit formed to follow the outline of the horizontal cross-section of the second housing. This enables efficient and compact integration of the grips in the second housing and the application of relatively large (preferably hand-sized) grips in a compact enclosure. These hand-sized, rigid and fire retardant grips 222a,b enable improved control of the fire blanket. The positioning on top of the second housing and the shape enables smooth and therefore quick removal of the fire blanket. Improved control and quick removability of the fire blanket, by consequence, improves safe use. FIG. 4b shows a close-up front view of a first grip 222a. FIG. 4c shows a close-up perspective view of the first grip 222a.

Figure 5A:
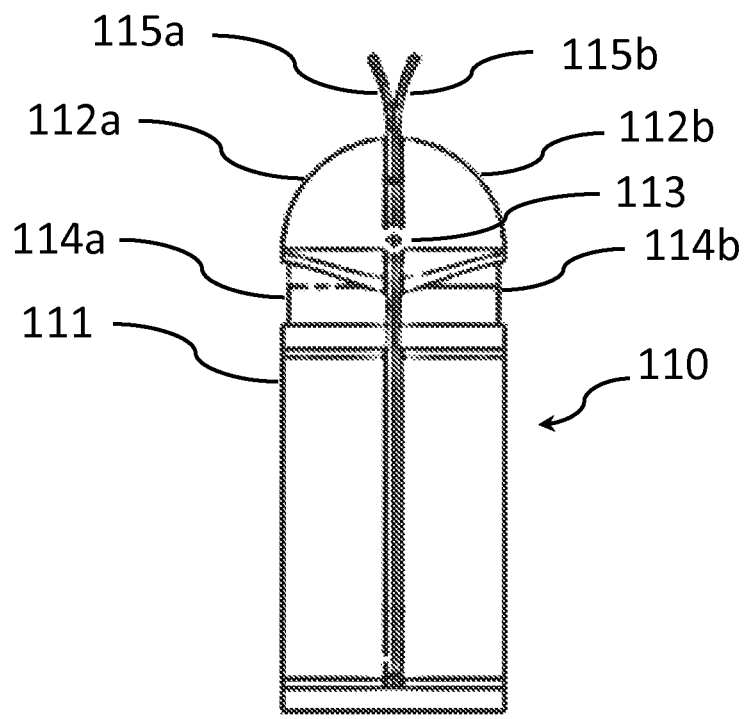
FIG. 5a,b,c are views of the Fire Equipment according to a preferred embodiment of the invention. The housing assembly for the fire extinguisher together with the fire blanket is shown with and without the first housing.

FIGS. 5a,b,c show a preferred embodiment of the invented Fire Equipment. FIG. 5a shows a closed situation of the first housing 110.

Figure 5B:
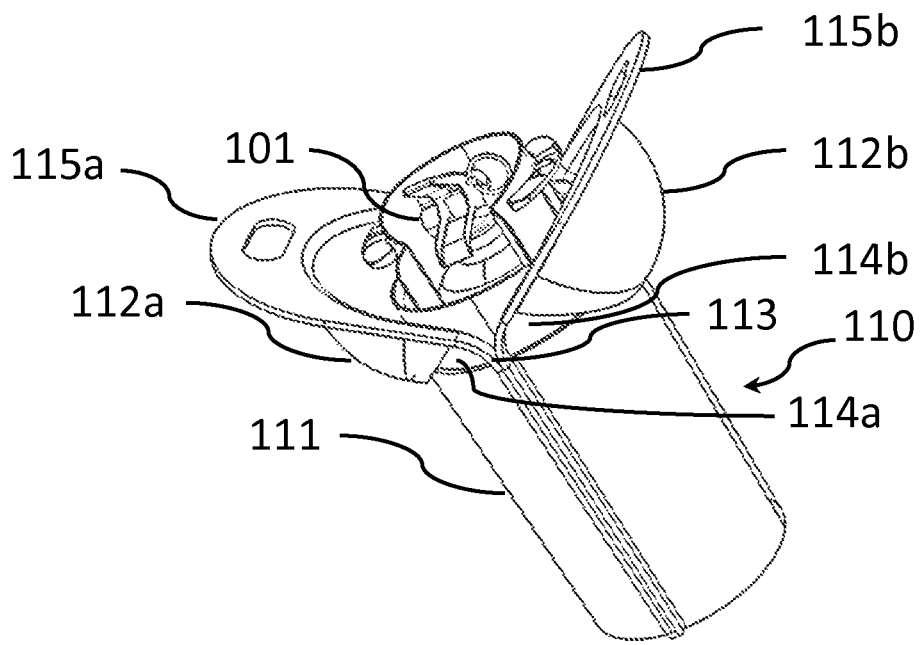

FIG. 5b shows an open situation of the first housing 110. In the open view a top part of the fire extinguisher 101 is also visible. The fire extinguisher may be removed by a user by grabbing the valve and drawing the fire extinguisher upwards from the housing assembly.

Figure 5C:
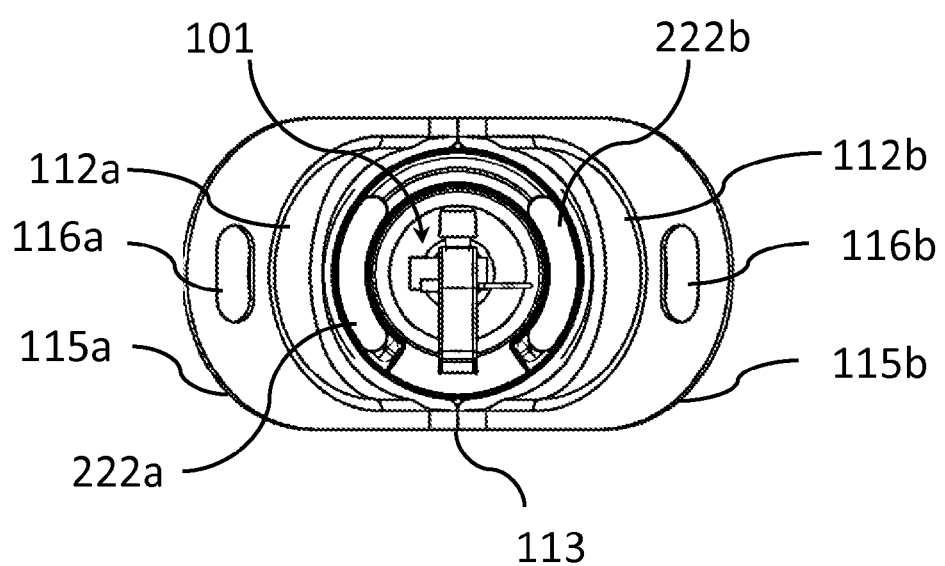

FIG. 5c shows a top view of the Fire Equipment in an open situation of first housing 110. In the top view, grips 222a,b are visible.

In FIGS. 5a and 5b, the at least partly rigid material of the lower part 111 of the first housing 110 forms a preferably sturdy casing to protect the Fire Equipment's contents such as the fire extinguisher and the fire blanket. By preference the first housing is formed to follow the shape of the canister of the fire extinguisher, which has in most cases a circular cross-section. The middle parts 114a,b comprise at least partly flexible material, for example reinforced textile. This is to provide a hinge for the upper closure parts 112,b.

Closure part 112a and/or 112b may be moved outward, wherein the closure part 112a and/or 112b hinges around fulcrum 114b.

To facilitate easy opening and closing of the first housing and to facilitate easy picking up and carrying of the Fire Equipment, the first housing is provided with at least one extended part 115a,b (hereinafter referred to as "flap") comprising at least one grip 116a,b. The grips 116a,b are preferably integrated in the closure parts 112a,b. The flaps 115a,b preferably stand apart sufficiently to enable a user to separately grab the grips manually and to easily part the closure parts away from each other.

Referring to FIG. 6a,b,c of the accompanying drawings, in accordance with the invention, a second housing 120 is provided to be utilised in conjunction with the fire blanket of FIG. 4. The inner wall 122 of the second housing 122 is curved around the cylindrical fire extinguisher of FIG. 3 (not shown in FIGS. 6b and 6c) to form a first hollow (number 105 in FIG. 6b,c) for the fire extinguisher of FIG. 3. Therefore the fire extinguisher 101 and the fire blanket 220 are separated from each other. The inner wall 122 will facilitate easy removal of the fire extinguisher without interfering with the fire blanket 220, which is wrapped around inner wall 122 and/or enclosed by outer wall 121. The fire blanket 220 is rolled-up, or folded, or folded and rolled-up to fit into second hollow 123. The fire blanket 220 may be removed in an upward motion by grasping grips 222a,b and pulling the fire blanket from its housing. Outer wall 121 is by itself sufficient to contain both fire blanket 220 and fire extinguisher 101, without the need for an inner wall 122. The fire blanket may be folded and/or rolled up in such a way to leave a first hollow 105 inside the outer wall 121 for removably housing the fire extinguisher 101. Adding inner wall 122 between the fire extinguisher and the fire blanket will result in an improvement as it forms a fixed housing for the fire blanket and the fire extinguisher. Storing of the fire extinguisher will therefore be optimal. It will also optimize storing of the fire blanket, and keep the fire blanket well in the folded or rolled up shape. Integration with the grips 222a,b and the form fit shape of the second housing with inner and outer wall will ensure that the fire blanket is stored in the prescribed manner in order to be removed easily and quickly at any time.

FIG. 6a shows a detail of second housing 120 with an outer wall 121 and an inner wall 122. The inner wall may protrude above the outer wall 121 to enclose the fire extinguisher 101 all the way to or near to the top of the fire extinguisher 101, whereas the outer wall 121 may be less high than inner wall to leave room for easy access to the grips 222a,b. The grips 222a,b will be separated by the protrusion of inner wall 122 from the fire extinguisher 101. In this way the grips 222a,b or the fire blanket 220 will not be obstructed by the valve of the fire extinguisher (not shown) when pulling the fire blanket 220 out of the second housing 120.

FIGS. 6b and 6c also show a detail of the construction of the second housing wherein lips 124a,b act as dividing wall to enclose fire blanket 220 (not shown). At the same time this construction makes it possible to leave space for the valve 104 of fire extinguisher 101. In particular grips 104a and 104b, as shown in FIG. 3, may protrude beyond the circumference of canister 102, but within the inner circumference of the outer wall 121 of the second housing 121. If outer wall 121 is left out, the grips may protrude beyond the circumference of the canister 102, but within the inner circumference of the first housing as shown in FIGS. 5a,b,c.

Leaving a space dedicated for the grips 104a,b of the valve 104, will guide the insertion of fire extinguisher 101 into a preferred position. It will also leave extra space for easy access to the grips 104a,b in case the fire extinguisher has to be removed.

Lips 124a,b will prevent parts of the fire blanket to come into contact with the fire extinguisher 101 and more particular to the grips 104a,b. In this way easy, quick and safe removal of the fire extinguisher 101 is possible without being obstructed by the presence of the fire blanket 220.

FIG. 6c shows a top view of a detail of second housing 120. Lips 124a,b are constructed in such a way to form a second hollow 123 for housing fire blanket 220.

The second housing is preferably moulded of a plastics material, such as polypropylene. Noticeably this preferred embodiment does not require a first housing as disclosed and described in FIGS. 5a,b,c. The second housing 120 may in fact be equipped with all the features of the first housing, including an opening and closing arrangement.

In use of the described Fire Equipment, in the event that a fire arises, a person using the apparatus will be able to select whether to use the fire extinguisher, or to use the fire blanket. If the fire extinguisher is to be utilised, the fire extinguisher is merely removed from the housing and is activated. If, for example, a frying pan is on fire or an outdoor barbecue is in uncontrolled fire, or a person's cloths have caught fire and the fire blanket is to be utilised, then the one or more grips are pulled to remove the fire blanket in an upward movement and to unfold the fire blanket immediately after removal.

In either event the grips at the top of the fire blanket will then be readily accessible, and an upwards pull on the grips will release the fire blanket from the housing. The fire blanket may then be immediately in the right position to fight a fire by covering a burning object and at the same time shield the user from the fire, or by wrapping a person or animal to extinguish cloths or fur which has caught fire.

Because of the upward movement of the fire blanket being positioned close to the floor, the user may immediately raise a shield between him and the fire.

The grips of the fire blanket may have rigid bars. These bars may be attached to the blanket in such a way that, when holding the blanket by a user, the user may use the grips to form an upside down letter "L". The top of the blanket therefore forms a more or less horizontal part, whereas the bigger part of the blanket hangs down. The fire blanket according to the invention is of larger size than a regular fire blanket. Regular fire blanket measure usually a width and length of around 120 centimeters. This usually suffices for extinguishing a typical frying pan being ablaze. According to the invention a larger fire blanket is proposed, which is suitable for putting out a fire of an exemplary frying pan or shielding an adult from fire in an effective way. In order to have the latter function the fire blanket measures a width of 100-140 centimeters and a height of 160-200 centimeters. Considering an average size of an adult male in Western Europe of 180 centimeters, a horizontal piece of the fire blanket of about 20 centimeter, a height at which the user holds the fire blanket by the grips of 160 centimeters, the optimal size of the fire blanket is a width of 120 centimeters and a height of 180 centimeters, with grips attached to the blanket having bars which cover 20 centimeters of the top of the blanket. The bars may measure a width of 2-4 centimeters and a length of 23-25 centimeters of which 3-5 centimeter protrude beyond the blanket.

By holding the blanket in this way, sufficient distance may be created between the fire and the user. The fire blanket of the proposed size is also very suitable for wrapping a person or pet animal in order to extinguish a fire caught by the person or animal.

The length of the bars may be limited by the depth of the housing in which the fire blanket together with the grips may be inserted.

In certain circumstances, it may be necessary to use both the fire extinguisher and the fire blanket to extinguish various kinds of fires. The invention provides easy and quick access to fire extinguisher, fire blanket, or both.

Whilst the invention has been described with reference to an embodiment in which the second housing, containing the fire blanket, is made of plastic, it is to be understood that the housing may be formed of any appropriate material, and may thus also be formed of metal. For reasons of an improved sustainable i.e. ecological design and the lowest impact on natural resources, (recyclable) polypropylene (PP) is the preferred choice as plastic in (parts of) the housing assembly. Especially recycled polypropylene is preferred for the same reason.

The Fire Equipment according to the invention may be expanded with additional functionalities, add-ons and content, which contribute to meeting the demands of improved safety, compactness, portability and integration.

Hereinafter some examples are described.

The surface material of the first housing may be made out of fire retardant material, such as fire retardant Ethylene-Vinyl Acetate (EVA) to protect the content.

The first housing may comprise a layer with temperature insulation material. This may slow down heating of the content, so the content may be removed manually with less chance for a user of getting burned by, for example, the metal of the canister of the fire extinguisher. The insulation material may also prevent freezing of the content to a certain extend. Freezing of the extinguishing material limits the working very much and therefore compromises safe use.

The Surface material of the first housing may have a distinctive colour or signs which fit the identity of the devices that are contained. The first housing may for example be (partly) red, or have highlighted coloured elements, or red signs which are generally associated with current firefighting equipment.

The Fire Equipment may comprise a tag or display for indicating for example the most recent date that the fire extinguisher or the fire blanket was removed. Instruction manuals of fire extinguisher and fire blanket often advise to test accessibility and use of fire equipment on a regular base. By keeping track of the test dates, one does not to keep track of the information in another information system, such as an agenda. The display may comprise a rewritable label, replaceable label or an electronic device such as a Liquid Crystal Display (LCD), having its own power source such as a battery. In the case of an LCD the last entered test date may be made visible by for example pushing a button.

By keeping track of the test dates, the safe use may be regularly practiced, hence improving safety.

The Fire Equipment may comprise a smoke detector, a carbon monoxide alarm, or any other fire alarm. The fire alarm may be integrated in the housing assembly, or the housing assembly may comprise a separate compartment for containing generally available fire alarms. In the case of fire in a building together with considerable smoke for example, the activation of the fire alarm, for example activating an audible alarm, may enable an inhabitant of the building to locate the Fire Equipment from hearing. This increases the accessibility of the Fire Equipment, hence improving safety.

The housing assembly of the Fire Equipment may comprise a compartment for containing an instruction manual. By keeping the instruction manual close to the devices to be used, by consequence safe use is improved.

Alternatively a reference to a Uniform Resource Locator (URL) may be applied to the housing. The reference may be a barcode or a Quick Response Code (QR Code), which is a matrix barcode or two-dimensional code. These codes may contain data readable by for example a Personal Digital Assistant (PDA) or Smart phone and enabling a software program to access a URL on the Internet or a locally stored file. The URL preferably comprises a website address. The referred website may show a user manual or an instructional movie for correct use of the Fire Equipment. The reference may also be a written web site address.

The URL may also comprise a resource on the internet for sending data to, or setting up a telephone connection with for example an emergency centre or a rescue unit. A first set of data to be sent to the emergency centre may comprise information on the type of Fire Equipment, name of the company owning the Fire Equipment, date of production, date of testing, contact information of the in-house emergency officer of a company, et cetera. In relation with sending the first set of data through a PDA to an emergency centre, a second set of data, which may comprise data of the user of the PDA and the location of the PDA (based on for example Global Positioning System (GPS) data) may be sent, preferably at more or less the same time. By correlating these two sets of data, the emergency centre may take appropriate action and may pinpoint the location of the emergency more easily. This will increase safety.

The invention is now described by the following aspects and embodiments.

In a first aspect of the invention, a Fire Equipment is provided, comprising a housing assembly for a fire extinguisher and a fire blanket, the fire extinguisher comprising a canister for containing fire extinguishing material and a valve for controlling the emission of the fire extinguishing material, the fire blanket comprising a blanket and one or more grips for manipulating the blanket, characterized in that the housing assembly comprises a first housing arranged for removably housing the fire blanket, wherein the fire blanket is rolled up, folded, or folded and rolled up, to leave a first hollow arranged for removably housing the fire extinguisher. This provides for a compact design of the housing, large integration of elements of the fire equipment and improved accessibility and movability.

In a first embodiment, the housing assembly further comprises a second housing arranged for removably housing the fire extinguisher and arranged for separating the fire extinguisher from the fire blanket. In this way removal of either fire extinguisher or fire blanket will not be obstructed by the one that stays in the housing assembly.

In a second embodiment, the second housing comprises an outer wall, an inner wall and a second hollow between the outer wall and the inner wall, wherein the second hollow is arranged for removably housing the fire blanket. In this way a further separation of the fire blanket from the fire extinguisher is achieved.

In a third embodiment, the housing assembly comprises one or more lips in longitudinal direction, arranged for separating the fire extinguisher from the fire blanket. In this way a further separation of the fire blanket from the fire extinguisher is achieved. When grabbing the fire extinguisher, the fire blanket is held in a position by the second housing and the lips, acting as dividing wall, the removal of the fire extinguisher will not be obstructed by the presence of the fire blanket and vice versa. By defining the position of the lips, the position of the fire blanket is also limited to a confinement.

In a fourth embodiment, the inner wall of the second housing protrudes above the outer wall of the second housing. In this way a further separation of the fire blanket from the fire extinguisher is achieved.

In a fifth embodiment, at least one wall of the housing assembly is substantially smooth. This enables a quick, unobstructed and easy removal of the fire extinguisher and/or fire blanket.

In a sixth embodiment, the first housing substantially enfolds the second housing. In this way the second housing remains secure within the first housing, therefore increasing safe use, safe and easy movability and compact design.

In a seventh embodiment, the housing assembly has a substantially circular cross section. A circular cross-section provides the most compact, i.e. efficient use of space when a fire extinguisher comprising a cylindrical formed canister is removably housed together with an enfolding rolled up fire blanket.

In an eight embodiment, the first housing has a circular cross section with a round angle of more than 180 degrees. This provides a further improvement in comparison with a round angle of less than 180 degrees.

In a ninth embodiment, the second housing has an at least partly circular cross section. A circular cross-section provides the most compact, i.e. efficient use of space when a fire extinguisher comprising a cylindrical formed canister is removably housed in the second housing.

In a tenth embodiment, the housing assembly is arranged for being opened or closed from the top by means of one or more closure parts, wherein a first closure part of the one or more closure parts is arranged for at least partly being moved away from the housing assembly. In this way after opening of the housing assembly the user may immediately see the contents and choose whether to remove the fire extinguisher or the fire blanket or both. The opening on the top provides easy access, when the Fire Equipment is positioned at a height which makes access from the top for a grown up easy and safe. Preferably, and this is communicate in the manual, the Fire Equipment is therefore put on a floor.

In eleventh embodiment, the first closure part comprises a substantially rigid upper part and a flexible lower part wherein the first closure part is arranged to be pivoted around a fulcrum, by folding the flexible lower part. This construction enables reduction of complexity of the closure construction and offers a reliable, durable and safe opening and closure of the housing assembly.

In a twelfth embodiment, a second closure part of the one or more closure parts is arranged for being in close contact with the first closure part in a closed position, the first and second closure part being held together by a clasping means of the group comprising:
  Velcro;
  magnetic strips;
  press fasteners; or
  a spring load.
These clasping means enable fast and easy closure, a simple, reliable and durable construction, with the least possible protruding elements in order to increase prolonged safe use In a thirteenth embodiment, the first closure part is arranged to be opened by a spring load, such as provided by an elastic band or a steel spring, connecting the first closure part to the housing assembly. As soon as the user moves the closure parts away from the housing assembly and/or from each other, the spring force will support the opening action and ensure that the housing assembly is completely opened and stays open, in order to facilitate quick and easy removal of fire extinguisher and/or fire blanket.

In a fourteenth embodiment, the housing assembly comprises a grip arranged for grasping and/or suspending the housing assembly. To facilitate carrying of the Fire Equipment grips are provided. The grips may be integrated in the closure parts. This increases the movability.

In a fifteenth embodiment, the fire equipment comprises at least one support, arranged for suspending the housing assembly. If for some reason a user wants to suspend the Fire Equipment, e.g. on a wall, the handle provides easy suspending and removal of the Fire Equipment, or access to the fire extinguisher and/or fire blanket. The preferred maximum height is about 150 centimeters, depending on the average length of an adult person.

In a sixteenth embodiment, the housing assembly comprises a tag comprising data of the group comprising:
- a Unique Resources locator URL, for locating a resource in a file system or a communication system such as Internet, wherein an Internet resource may comprise a web site address;
- a written indication of a location for retrieval of further information, such as a web site containing a user manual or instructional video;
- a user manual;
- one or more symbols providing information on the contents of the fire equipment or use of the fire equipment;
- a date of production; a date of testing of the fire equipment; contact information of an emergency centre;
- contact information of an in-house emergency officer; contact information of a manufacturer of the fire equipment;
- contact information of a company using the fire equipment; a list of content of elements of the fire equipment;
- a list of characteristics of the elements of the fire equipment.

The tag offers information to the user, manufacturer or service centre for safe use or advice about safe use.

In a seventeenth embodiment, the tag comprises a code such as a bar code or a Quick Response Code, or a Liquid Crystal Display. These codes are readable by smart phones, special bar code reader. The Liquid Crystal Display (LCD) provides for a more flexible display of information, which may be programmable by e.g. the manufacturer or the user. For example a timer may be displayed showing the date that the fire equipment needs servicing. This increases safe use and a durable reliability of the Fire Equipment.

In an eighteenth embodiment, the housing assembly comprises a compartment for a warning device of the group comprising:
- a smoke detector;
- a carbon monoxide detector;
- a fire detector
- or a fire alarm.

In a nineteenth embodiment, the housing assembly comprises a power supply, such as one or more solar cells, or a battery for supplying power to accessories of the group comprising:
- a warning device;
- a smart phone;
- a luminaire;
- a loudspeaker; an amplifier for amplifying a signal to the speaker.

In this way safety increasing accessories can be powered. This stimulates the user to add these useful accessories to the contents of the Fire Equipment.

In a twentieth embodiment, the first housing comprises an arrangement for moving the fire equipment, such as one or more wheels located at the bottom of the fire equipment or a shoulder-strap. This increases movability and especially in the case when the user needs free hands to act in case of an emergency.

In a twenty-first embodiment, the housing assembly comprises fire retardant material and/or temperature insulation material. In case of a fire near the Fire Equipment, the Fire Equipment will not catch fire easily, which increases accessibility of the Fire Equipment and its contents. The temperature insulation will improve the operability of esp. the fire extinguisher in a cold or hot environment.

In twenty-second embodiment, the fire extinguisher comprises a valve, which protrusion does not protrude beyond the circumference of an inside of an exterior wall of the housing assembly. In this way the housing will not obstruct the removal of the fire extinguisher. The design may stay compact, thus providing improved movability.

In a second aspect of the invention, a fire extinguisher is provided, comprising a canister for containing fire extinguishing material and a valve for controlling the emission of the fire extinguishing material, characterized in that the valve does not protrude substantially beyond the circumference of the canister. The fire extinguisher is especially designed to be used with the Fire Equipment. This increases integration, compactness and safe use. None or limited protruding elements of the fire extinguisher decrease the chance of being obstructed by e.g. the cloth of the fire blanket. This increases quick and easy removal and safe use.

In third aspect of the invention, a fire blanket comprising a blanket and one or more grips for manipulating the blanket, characterized in that the one or more grips comprise a rigid bar. In this way the fire blanket is easily manipulated. The arrangement fits or may be designed to fit the housing assembly and the grips may be positioned in an upright position to provide easy access from the top. The user can immediately grab the grips from the housing assembly. Also in the case when the housing assembly needs to be opened first.

In a first embodiment of the third aspect of the invention, the one or more grips are arranged to fit into the second housing of the housing assembly. This enables a form fit design and a non-obstructing storing of the fire blanket. This also enables a compact design. The access and the movability are thus improved.

In a second embodiment of the third aspect of the invention, the blanket measures a width of 100-140 centimeters and a height of 160-200 centimeters. These measures are suitable for covering an average adult person, which increases safe use. The larger size also increases the shielding abilities when the fire blanket is held in a vertical position.

In a fourth aspect of the invention a service is provided, wherein a user of the Fire Equipment is notified of information relating to the safe use of the Fire Equipment, characterized in that the service comprises the following steps:
- The user registers the Fire Equipment at a website of a website owner, such as a supplier or a manufacturer of the Fire Equipment;
- The website owner sets a warning which is appropriate at a certain time or situation.

As soon as the certain appropriate time or situation is realized, the website owner, the supplier or the manufacturer may send a notice to the user, using communication means such as SMS, e-mail or telephone, the notice comprising one of the group comprising:

A reminder that the Fire Equipment and/or parts of the Fire Equipment need to be tested;

A reminder that the user should bring the Fire Equipment with him on a holiday, to a barbecue in the garden or outside at a fireworks display;

A reminder to test the pressure of the fire extinguisher canister

An announcement of a novel safety improving product.

The term "substantially" herein, such as in "substantially enfolds" or in "substantially smooth", etc., will be understood by the person skilled in the art. In embodiments the adjective substantially may be removed. Where applicable, the term "substantially" may also include embodiments with "entirely", "completely", "all", etc. Where applicable, the term "substantially" may also relate to 90% or higher, such as 95% or higher, especially 99% or higher, including 100%. The term "comprise" includes also embodiments wherein the term "comprises" means "consists of. Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of being arranged in other sequences than described or illustrated herein.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The term "and/or" includes any and all combinations of one or more of the associated listed items. The article "a" or "an" preceding an element does not exclude the presence of a plurality of such elements. The article "the" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

BEST MODE FOR CARRYING OUT THE INVENTION

The best mode for carrying out the invention is to provide a Fire Equipment comprising a housing assembly for a fire extinguisher and a fire blanket, the fire extinguisher comprising a canister for containing fire extinguishing material and a valve for controlling the emission of the fire extinguishing material, the fire blanket comprising a blanket and one or more grips for manipulating the blanket, wherein the housing assembly comprises a first housing arranged for removably housing the fire blanket, wherein the fire blanket is rolled up, folded, or folded and rolled up, to form a first hollow 105 arranged for removably housing the fire extinguisher. The first housing most preferably contains a second housing arranged for removably housing the fire extinguisher and separating the fire extinguisher from the fire blanket. The second housing most preferably comprises an outer wall, an inner wall and a second hollow 123 between the outer wall and the inner wall, wherein the second hollow 123 is arranged for removably housing the fire blanket.

INDUSTRIAL APPLICABILITY

The primary application of the invention is in a private household, office space, kitchen, caravan, tent or other spaces where open fires may occur or where fire hazard is present. Especially the portability of the Fire Equipment makes the invention suitable for situations where a fixed placement on a wall is limiting the flexibility of the use of the invention. The Fire Equipment according to the invention may be carried in a camper, on a boat or in a truck, or placed near a barbecue outside, a fireworks event, in a holiday accommodation or temporary residence.

The invention claimed is:

1. A fire equipment system for use with fire extinguishing material, comprising:
    a fire extinguisher that includes a canister arranged for containing the fire extinguishing material and a valve arranged for controlling emission of the fire extinguishing material;
    a fire blanket that includes a blanket body and one or more grips, arranged for manipulating the blanket body; and
    a housing assembly for housing the fire extinguisher and the fire blanket, the housing assembly including a first housing, arranged for removably housing the fire blanket in a rolled, folded, or folded and rolled configuration such that the fire blanket forms a first hollow for removably housing the fire extinguisher, the housing assembly further includes a second housing, arranged for removably housing the fire extinguisher and arranged for separating the fire extinguisher and the fire blanket.

2. The fire equipment according to claim 1, wherein the second housing comprises an outer wall, an inner wall and a second hollow between the outer wall and the inner wall, wherein the second hollow is arranged for removably housing the fire blanket.

3. The fire equipment according to claim 2, wherein the inner wall of the second housing protrudes above the outer wall of the second housing.

4. The fire equipment according to claim 1, wherein the housing assembly comprises one or more lips in longitudinal direction, arranged for separating the fire extinguisher from the fire blanket.

5. The fire equipment according to claim 1, wherein the second housing has an at least partly circular cross section.

6. The fire equipment according to claim 1, wherein the housing assembly is arranged to be opened or closed from a top by one or more closure parts wherein a first closure part of the one or more closure parts comprises a substantially rigid upper part and a flexible lower part, and wherein the first closure part is arranged to be pivoted around a fulcrum by folding the flexible lower part.

7. The fire equipment according to claim 6, wherein a second closure part of the one or more closure parts is arranged for being in close contact with the first closure part in a closed position, the first closure part and the second closure part being held together by a clasping means of the group of clasping means comprising:

a hook and loop fastener;
magnetic strips;
press fasteners; and
a spring load.

8. The fire equipment according to claim 6, wherein the first closure part is arranged to be opened by a spring load connecting the first closure part to the housing assembly.

9. The fire equipment according to claim 1, wherein the housing assembly comprises a grip arranged for grasping and/or suspending the housing assembly.

10. The fire equipment according to claim 1, the housing assembly comprises a label of a group of labels comprising:
   a Unique Resources locator URL, arranged for locating a resource in a file system or a communication system, wherein an Internet resource comprises a web site address;
   a written indication of a location for retrieval of further information;
   a user manual;
   one or more symbols providing information on contents of the fire equipment;
   a date of production;
   a date of testing of the fire equipment;
   contact information of an emergency center;
   contact information of an in-house emergency officer;
   contact information of a manufacturer of the fire equipment;
   contact information of a company using the fire equipment;
   a list of characteristics of elements of the fire equipment;
   a bar code; and
   a Quick Response Code.

11. The fire equipment according to claim 1, wherein the housing assembly comprises a compartment for a warning device of a group of warning devices comprising:
   a smoke detector;
   a carbon monoxide detector;
   a fire detector; and
   a fire alarm.

12. The fire equipment according to claim 1, wherein the housing assembly comprises a power supply arranged for supplying electrical power to accessories of a group of accessories comprising:
   a warning device;
   a smart phone;
   a luminaire;
   a loudspeaker; and
   an amplifier for amplifying a signal to the loudspeaker.

13. The fire equipment according to claim 1, wherein the first housing comprises an arrangement for moving the fire equipment.

14. The fire equipment according to claim 13, wherein the arrangement for moving the fire equipment comprises one or more wheels located at a bottom of the fire equipment, or a shoulder-strap.

15. The fire equipment according to claim 1, wherein the housing assembly comprises a fire retardant material and/or temperature insulation material.

16. The fire equipment according to claim 1, wherein the one or more grips comprise a rigid bar attached to the blanket, of which rigid bar a substantial part covers the fire blanket and a relatively small part protrudes beyond the blanket.

17. The fire equipment according to claim 16, wherein the one or more grips comprise a part arranged for pulling the fire blanket out of the second housing of the housing assembly, wherein said part is arranged to follow an outline of a horizontal cross-section of the second housing.

18. The fire equipment according to claim 16, wherein the fire blanket measures a width of 100-140 centimeter and a height of 160-200 centimeter.

19. A method for providing a service comprising: providing the fire equipment of claim 1; informing a user of information in relation to a safe use of the fire equipment wherein;
   the user registers the fire equipment at a web site of a website owner;
   the web site manager sets a warning which is appropriate at a certain time and/or a particular situation;
   as soon as the certain time and/or the particular situation occurs, the web site owner, supplier or manufacturer sends a notice to the user of the fire equipment, by using communication means, wherein the notice comprises a notice of a group of notices comprising:
      a reminder that the fire equipment and/or parts of the fire equipment need to be tested;
      a reminder that the user should bring the fire equipment with him on a holiday, to a barbecue in a garden, or outside at a fireworks display;
      a reminder to test a pressure of the canister of the fire extinguisher; and
      an announcement of a novel safety improving product.

20. A fire equipment system comprising:
   a housing assembly for a fire extinguisher and a fire blanket;
   the fire extinguisher including fire extinguishing material, a canister arranged for containing the fire extinguishing material, and a valve arranged for controlling emission of the fire extinguishing material;
   the fire blanket including a blanket body and one or more grips arranged for manipulating the blanket body;
   the housing assembly for the fire extinguisher and fire blanket includes a first housing for removably housing the fire blanket in a rolled, folded or folded and rolled configuration in which the fire blanket forms a first hollow for housing the fire extinguisher; and
   the housing assembly further comprising a second housing arranged for removably housing the fire extinguisher and arranged for separating the fire extinguisher and the fire blanket, the first housing assembly substantially enfolding the second housing assembly.

* * * * *